United States Patent

Uehara et al.

[11] Patent Number: 6,067,038
[45] Date of Patent: May 23, 2000

[54] VEHICLE-MOUNTED RADAR APPARATUS

[75] Inventors: Naohisa Uehara; Masahiro Watanabe, both of Tokyo, Japan

[73] Assignee: Mitsubishi Denki Kabushiki Kaisha, Tokyo, Japan

[21] Appl. No.: 09/017,162

[22] Filed: Feb. 2, 1998

[30] Foreign Application Priority Data

Aug. 21, 1997 [JP] Japan ................................. 9-224806

[51] Int. Cl.[7] .................................................. G01S 13/93
[52] U.S. Cl. ................................ 342/70; 342/71; 342/109
[58] Field of Search ............................. 342/70, 71, 109, 342/114, 128

[56] References Cited

U.S. PATENT DOCUMENTS

| | | | |
|---|---|---|---|
| 5,694,130 | 12/1997 | Suzuki et al. | 342/70 |
| 5,745,070 | 4/1998 | Yamada | 342/70 |
| 5,767,803 | 6/1998 | Yamada | 342/70 |
| 5,793,325 | 8/1998 | Yamada | 342/70 |

FOREIGN PATENT DOCUMENTS

| | | | |
|---|---|---|---|
| 8-5733 | 1/1996 | Japan | G01S 13/34 |
| 8-211145 | 8/1996 | Japan | G01S 13/60 |

*Primary Examiner*—Ian J. Lobo
*Attorney, Agent, or Firm*—Sughrue, Mion, Zinn, Macpeak & Seas, PLLC

[57] ABSTRACT

A vehicle-mounted radar apparatus comprises: a transmitting-receiving device 8 including an FM modulator 1 for generating an FM modulation signal, a voltage controlled oscillator 2 for generating an electromagnetic wave subjected to FM modulation by the FM modulation signal, a transmitting antenna 4 for transmitting the FM-modulated electromagnetic wave, a receiving antenna 6 for receiving the electromagnetic wave reflected by a preceding vehicle 5, and a mixer 7 for mixing the FM-modulated electromagnetic wave and the electromagnetic wave from the receiving antenna and for outputting a beat signal; a signal processor 9 for computing a relative velocity and a relative distance with respect to the preceding vehicle on the basis of the beat signal; and a scanning mechanism 12 for rotatively driving the transmitting-receiving device, wherein a modulation period of the FM-modulated electromagnetic wave and a rotation angle range of the scanning mechanism are changed in accordance with the relative velocity and the relative distance with respect to the preceding vehicle.

8 Claims, 8 Drawing Sheets

CONCEPTUAL DIAGRAM OF
TRANSMITTED AND RECEIVED SIGNALS

VEHICLE-MOUNTED RADAR APPARATUS

BACKGROUND OF THE INVENTION

The present invention relates to a vehicle-mounted radar apparatus which is mounted in an automobile or the like for measuring the relative distance and the relative velocity with respect to a preceding vehicle or the like.

Figure 9:
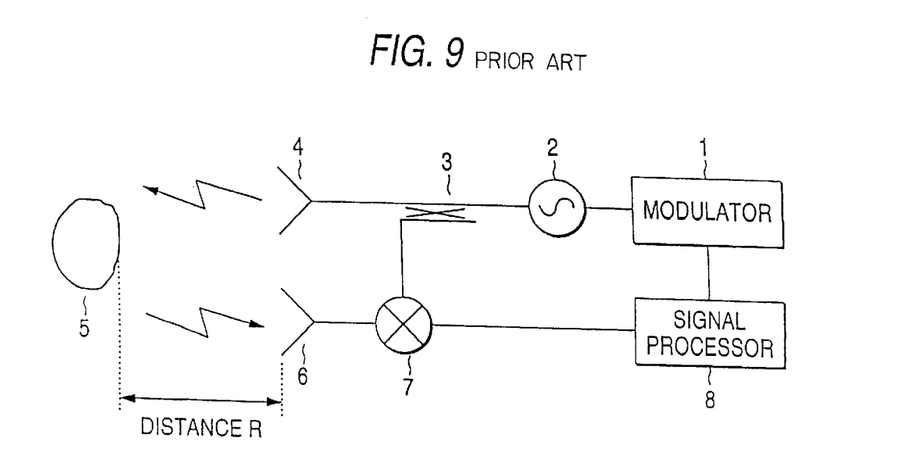
FIG. 9 is a block diagram illustrating the configuration of a conventional vehicle-mounted radar apparatus.

As an apparatus of this type, a vehicle-mounted radar apparatus such as the one shown in FIG. 9 is known. This radar apparatus is comprised of a modulator 1 for outputting a voltage signal for FM modulation; an oscillator 2 for generating an electromagnetic wave subjected to FM modulation; a direction coupler (power divider) 3 for dividing the electromagnetic wave from the oscillator 2 to a transmitting antenna 4 and a mixer 7; the transmitting antenna 4 for outputting the electromagnetic wave to space in such as the forward direction of the vehicle; a receiving antenna 6 for receiving the electromagnetic wave reflected from a target object 5; the mixer 7 for mixing the transmitted electromagnetic wave and the received electromagnetic wave; and a signal processing circuit 8 for computing the relative distance to the target object and the relative velocity on the basis of a beat signal outputted from the mixer 7.

Next, a description will be given of the operation of the conventional apparatus configured as described above. The modulator 1 outputs a voltage signal for linear FM modulation. The voltage controlled oscillator 2 generates an electromagnetic wave subjected to FM modulation on the basis of the voltage signal for FM modulation. The electromagnetic wave is divided into two portions by the power divider 3, and one portion is inputted to the mixer 7. The other portion is outputted from the transmitting antenna 4 into space. The electromagnetic wave outputted to space from the transmitting antenna 4 is reflected by the target object 5, and is inputted to the receiving antenna 6 with a delay time Td with respect to the transmitted electromagnetic wave. Further, in a case where the target object 5 has a relative velocity, the received electromagnetic wave is inputted to the receiving antenna 6 with a Doppler shift Fd with respect to the transmitted electromagnetic wave. The electromagnetic wave received by the receiving antenna 6 is mixed with the transmitted electromagnetic wave by the mixer 7, and a beat signal corresponding to the time delay Td and the Doppler shift Fd is outputted. On the basis of the beat signal, a signal processor 9 computes the relative distance to the target object 5 and the relative velocity.

Figure 10:
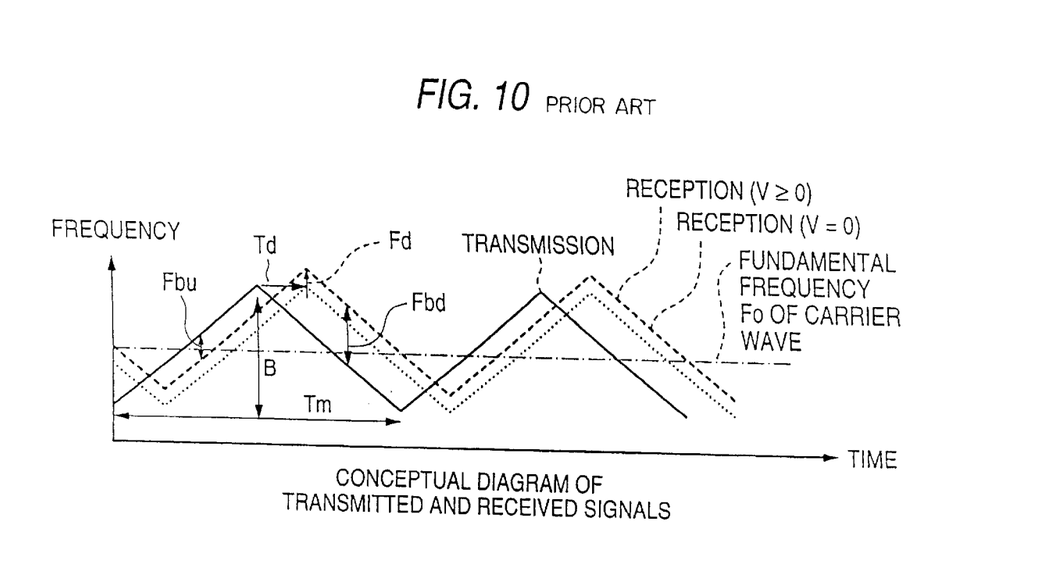
FIG. 10 is an explanatory diagram illustrating a method of computing the relative distance and the relative velocity using the conventional vehicle-mounted radar apparatus.

Next, a description will be given of a method of computing the relative distance and the relative velocity. FIG. 10 shows one example for computing the relative distance and the relative velocity using the above-described radar apparatus. In FIG. 10, the transmitted electromagnetic wave is subjected to FM modulation with a frequency sweep bandwidth B and a modulation period Tm of the transmitted electromagnetic wave. The received electromagnetic wave waits for the time delay Td from the time the transmitted electromagnetic wave is reflected by the target object 5 which is present at a distance R until it is inputted to the receiving antenna 6. In addition, in a case where the target object 5 has a relative velocity, the received electromagnetic wave undergoes a Doppler shift by Fd with respect to the transmitted electromagnetic wave. At this time, a frequency difference Fbu between the transmitted signal and the received signal during a frequency rise and a frequency difference Fbd between the transmitted signal and the received signal during a frequency drop are outputted as the beat signal by the mixer. On the basis of the frequency differences Fbu and Fbd, the modulation period Tm, and the frequency sweep bandwidth B, as well as the light velocity C (=3.0×10$^8$ m/s) and the wavelength λ of a carrier wave (if the fundamental frequency $F_o$ of the carrier wave is 60 GHz, then λ=5.0×10$^{-3}$ m, the relative distance R and the relative velocity V with respect to the target object can be determined by the following formulae (1):

$$R=Tm \cdot C/8B(Fbu+Fbd), V=\lambda/4(Fbu-Fbd) \quad (1)$$

In addition, in a case where a plurality of target objects 5 are present, Fbu and Fbd of the same object are selected from a plurality of frequency differences Fbu between the transmitted signal and the received signal during a frequency rise and a plurality of frequency differences Fbd between the transmitted signal and the received signal during a frequency drop, and the relative distance R and the relative velocity V are determined in accordance with the formulae (1).

Next, if it is assumed that the resolutions (minimum steps of data values outputted discretely) of the relative distance R and the relative velocity V are ΔR and ΔV, respectively, the resolutions ΔR and ΔV can be respectively determined by the following formulae (2):

$$\Delta R=C/2B, \Delta V=\lambda/Tm \quad (2)$$

The above-described radar apparatus is used for a following-distance warning apparatus which informs the driver of a danger by issuing a warning when a distance with a preceding vehicle has become shorter than a safe following distance and the danger of a collision has become heightened, or for effecting follow-up traveling by keeping a safe following distance. However, particularly when follow-up traveling is effected, if the aforementioned modulation period Tm is short, the resolution ΔV of the relative velocity V deteriorates, so that the riding comfort becomes aggravated. In addition, if the modulation period Tm is long, the data output period becomes long, with the result that the position and the velocity of the preceding vehicle change substantially during the output period, resulting in the deterioration of measurement accuracy.

To overcome the above-described problems, in Unexamined Japanese Patent Publication 8-211145/(1996) and 8-5733/(1996), the modulation period Tm is changed in correspondence with the traveling conditions, and the modulation period Tm is repeatedly changed to measure with high accuracy objects including those located in the far distance and those located in the near distance.

In a case where, for example, the above-described vehicle-mounted radar apparatus is made to continuously effect scanning mechanically, if the modulation period Tm is made long, the velocity resolution ΔV improves. However, the amounts of change of the relative distance and the relative velocity of the target object become large, so that the accuracy of the measured relative distance and relative velocity declines, and there are cases where-the object which reflects the electromagnetic wave during a transmission frequency rise and the object which reflects the electromagnetic wave during a transmission frequency drop are not identical, outputting erroneous data.

SUMMARY OF THE INVENTION

The present invention has been devised to overcome the above-described problems, and its object is to provide a vehicle-mounted radar apparatus which is capable of improving the accuracy of the distance and the relative velocity by improving the distance resolution and the relative velocity resolution in correspondence with the traveling conditions, and which is capable of shortening the time duration for extracting a preceding vehicle from among a plurality of target objects by shortening the period of detecting a target object in a wide range.

The vehicle-mounted radar apparatus in accordance with the present invention comprises: a transmitting-receiving device for transmitting an FM-modulated electromagnetic wave to a target object and receiving a reflected electromagnetic wave from the target object; a signal processor for computing a relative velocity and a relative distance with respect to the target object upon receiving an output of the transmitting-receiving device; and a scanning mechanism for rotatively driving the transmitting-receiving device, wherein a modulation period of the FM-modulated electromagnetic wave and a rotation angle range of the scanning mechanism are changed in accordance with the relative velocity and the relative distance with respect to the target object.

Further, the vehicle-mounted radar apparatus in accordance with the invention comprises: a transmitting-receiving device including an FM modulator for generating an FM modulation signal, a voltage controlled oscillator for generating an electromagnetic wave subjected to FM modulation by the FM modulation signal, a power divider for dividing the FM-modulated electromagnetic wave into two portions, a transmitting antenna for transmitting one divided portion of the FM-modulated electromagnetic wave, a receiving antenna for receiving the electromagnetic wave reflected by a target object, and a mixer for mixing another divided portion of the FM-modulated electromagnetic wave and the electromagnetic wave from the receiving antenna and for outputting a beat signal; a signal processor for computing a relative velocity and a relative distance with respect to the preceding vehicle on the basis of the beat signal; and a scanning mechanism for rotatively driving the transmitting-receiving device, wherein a modulation period of the FM modulator and a rotation angle range of the scanning mechanism are changed in accordance with the relative velocity and the relative distance with respect to the target object.

Furthermore, the vehicle-mounted radar apparatus in accordance with the present invention comprises: a transmitting-receiving device for transmitting an FM-modulated electromagnetic wave to a target object and receiving a reflected electromagnetic wave from the target object; a signal processor for computing a relative velocity and a relative distance with respect to the target object upon receiving an output of the transmitting-receiving device; and a scanning mechanism for rotatively driving the transmitting-receiving device, wherein a preceding vehicle on a same lane as a lane where a subject vehicle is traveling is extracted, and a modulation period of the FM-modulated electromagnetic wave and a rotation angle range of the scanning mechanism are changed in accordance with the relative velocity and the relative distance with respect to the preceding vehicle.

Moreover, the vehicle-mounted radar apparatus in accordance with the invention comprises: a transmitting-receiving device including an FM modulator for generating an FM modulation signal, a voltage controlled oscillator for generating an electromagnetic wave subjected to FM modulation by the FM modulation signal, a power divider for dividing the FM-modulated electromagnetic wave into two portions, a transmitting antenna for transmitting one divided portion of the FM-modulated electromagnetic wave, a receiving antenna for receiving the electromagnetic wave reflected by a preceding vehicle, and a mixer for mixing another divided portion of the FM-modulated electromagnetic wave and the electromagnetic wave from the receiving antenna and for outputting a beat signal; a signal processor for computing a relative velocity and a relative distance with respect to the preceding vehicle on the basis of the beat signal; and a scanning mechanism for rotatively driving the transmitting-receiving device, wherein the preceding vehicle on a same lane as a lane where a subject vehicle is traveling is extracted, and a modulation period of the FM-modulated electromagnetic wave and a rotation angle range of the scanning mechanism are changed in accordance with the relative velocity and the relative distance with respect to the preceding vehicle.

Still further, in the vehicle-mounted radar apparatus in accordance with the present invention, a steering sensor is used as a means for extracting the preceding vehicle on the same lane as the lane where the subject vehicle is traveling.

Still further, in the vehicle-mounted radar apparatus in accordance with the present invention, a camera is used as a means for extracting the preceding vehicle on the same lane as the lane where the subject vehicle is traveling.

DETAILED DESCRIPTION OF THE PREFERRED EMBODIMENTS

First Embodiment

Figure 1:
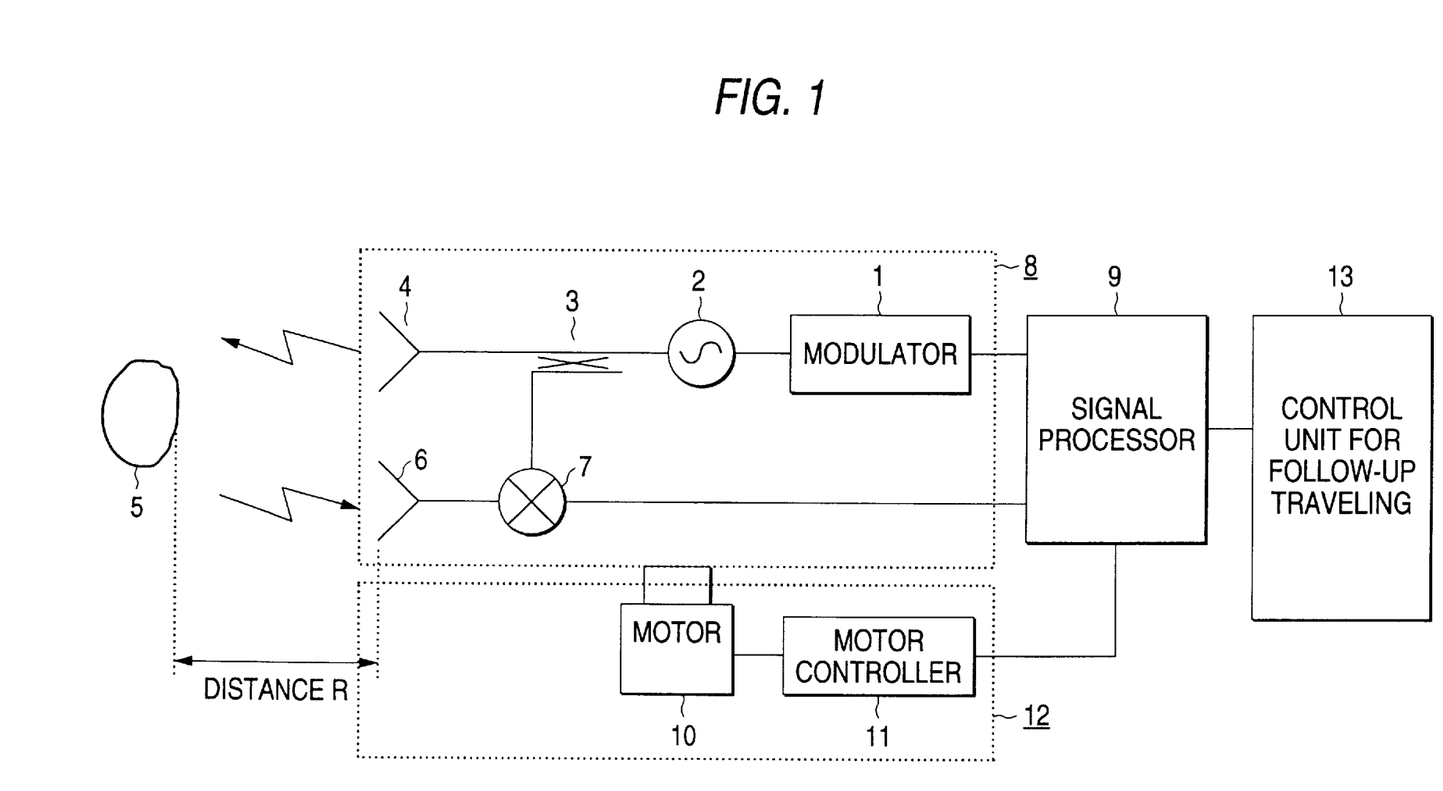
FIG. 1 is a block diagram illustrating the configuration of a vehicle-mounted radar apparatus in accordance with a first embodiment of the present invention.

FIG. 1 is a block diagram illustrating the configuration of a vehicle-mounted radar apparatus in accordance with a first embodiment of the present invention. A transmitting-receiving device 8 of this vehicle-mounted radar apparatus is comprised of a modulator 1 for outputting a voltage signal for FM modulation; a voltage controlled oscillator 2 for outputting an electromagnetic wave subjected to FM modulation; a direction coupler (power divider) 3 for dividing the electromagnetic wave from the oscillator 2 to a transmitting antenna 4 and a mixer 7; the transmitting antenna 4 for outputting the electromagnetic wave to space in such as the forward direction of the vehicle; a receiving antenna 6 for receiving the electromagnetic wave reflected from a target object 5; and the mixer 7 for mixing the transmitted electromagnetic wave and the received electromagnetic wave. A signal processor 9 performs the function of computing the relative distance to the target object 5 and the relative velocity on the basis of a beat signal outputted from the mixer 7, and the relative distance and the relative velocity are transmitted to a control unit 13 for follow-up traveling.

In addition, a scanning mechanism 12 controls the rotation of the transmitting-receiving device 8, and includes a motor 10 for rotating the transmitting-receiving device 8 and a motor controller 11 for controlling the rotation of the motor 10.

Figure 2:
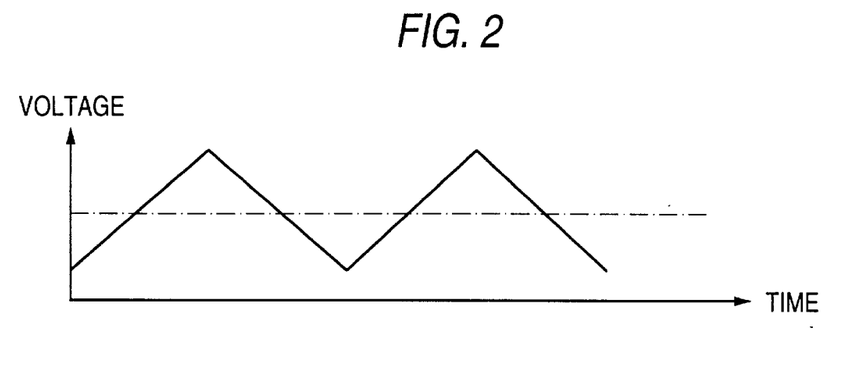
FIG. 2 is an explanatory diagram illustrating an output of a modulator 1 in the first embodiment.
Figure 3:
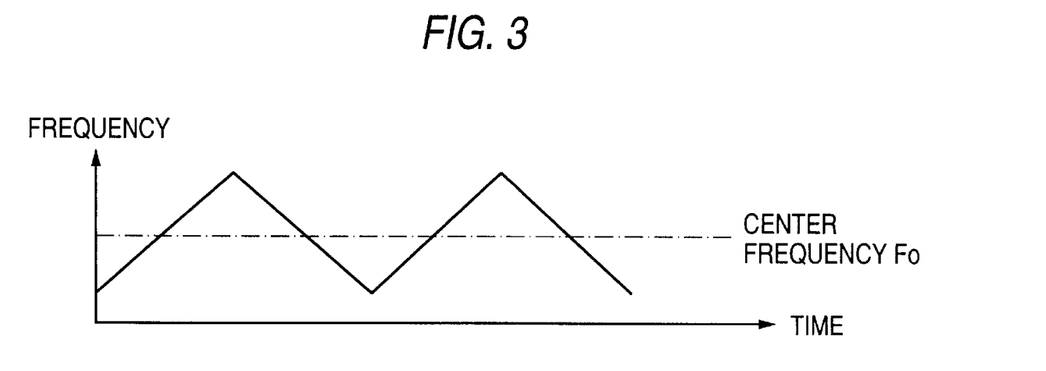
FIG. 3 is an explanatory diagram illustrating an output of a voltage controlled oscillator 2 in the first embodiment.
Figure 4:
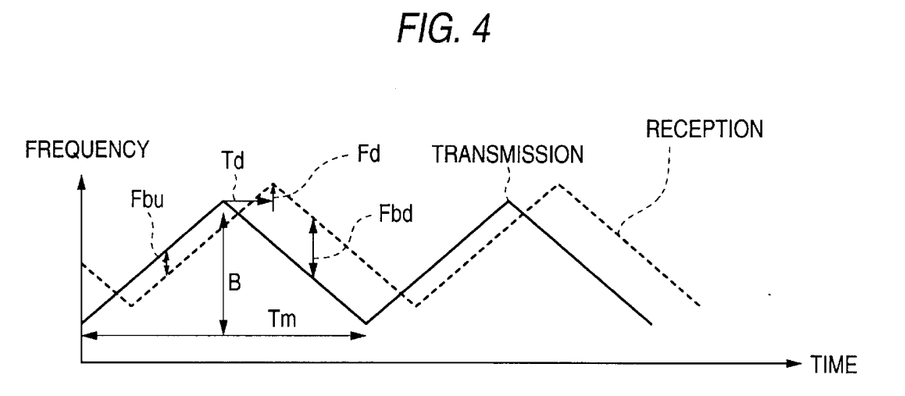
FIG. 4 is an explanatory diagram illustrating transmitted electromagnetic waves and received electromagnetic waves in the first embodiment.
Figure 5:
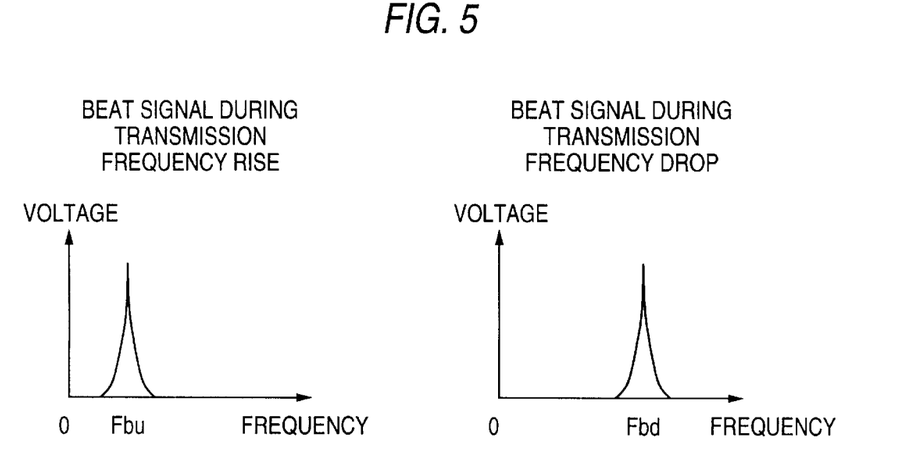
FIG. 5 is an explanatory diagram illustrating an output beat signal from a mixer,7 in the first embodiment.

Next, a description will be given of the operation of the vehicle-mounted radar apparatus in accordance with the first embodiment configured as described above. The modulator 1 outputs a voltage signal for linear FM modulation, as shown in FIG. 2. The voltage controlled oscillator 2 generates an electromagnetic wave subjected to FM modulation on the basis of the voltage signal for FM modulation outputted by the modulator 1, as shown in FIG. 3. The electromagnetic wave outputted from the voltage controlled oscillator 2 is divided into two portions by the power divider 3, and one portion is inputted to the mixer 7, while the other portion is outputted from the transmitting antenna 4 into space. The electromagnetic wave outputted to space from the transmitting antenna 4 is radiated to the target object 5 which is located at a distance R. and its reflected electromagnetic wave is inputted to the receiving antenna 6 with a delay time Td which is dependent on the distance R with respect to the transmitted electromagnetic wave, as shown in FIG. 4. Further, in a case where the target object 5 has a relative velocity, the received electromagnetic wave is inputted to the receiving antenna 6 by undergoing a Doppler shift by Fd with respect to the transmitted electromagnetic wave. The electromagnetic wave received by the receiving antenna 6 is mixed with the transmitted electromagnetic wave from the power divider 3 by the mixer 7, and a beat signal corresponding to the time delay Td and the Doppler shift Fd is outputted, as shown in FIG. 5.

On the basis of the beat signal generated by the transmitting-receiving device 8, the signal processor 9 computes the relative distance to the target object 5 and the relative velocity in accordance with Formulae (1) below. The transmitting-receiving device 8 and the signal processor 9 are identical to those of the conventional apparatus. Further, data on the relative distance to the target object and the relative velocity is sent to the control unit 13 for follow-up traveling.

$$R=Tm\cdot C/8B(Fbu+Fbd), V=\lambda/4(Fbu-Fbd) \quad (1)$$

where,

| | |
|---|---|
| Tm: | frequency period |
| B: | frequency sweep bandwidth |
| Fbu: | frequency difference between a transmitted signal and a received signal during a frequency rise |
| Fbd: | frequency difference between a transmitted signal and a received signal during a frequency drop |
| C: | light velocity (= $3.0 \times 10^8$ m/s) |
| $\lambda$: | wavelength of a carrier wave (if a fundamental frequency $F_0$ of the carrier wave is 60 GHz, then $\lambda = 5.0 \times 10^{-3}$ m) |

Figure 6:
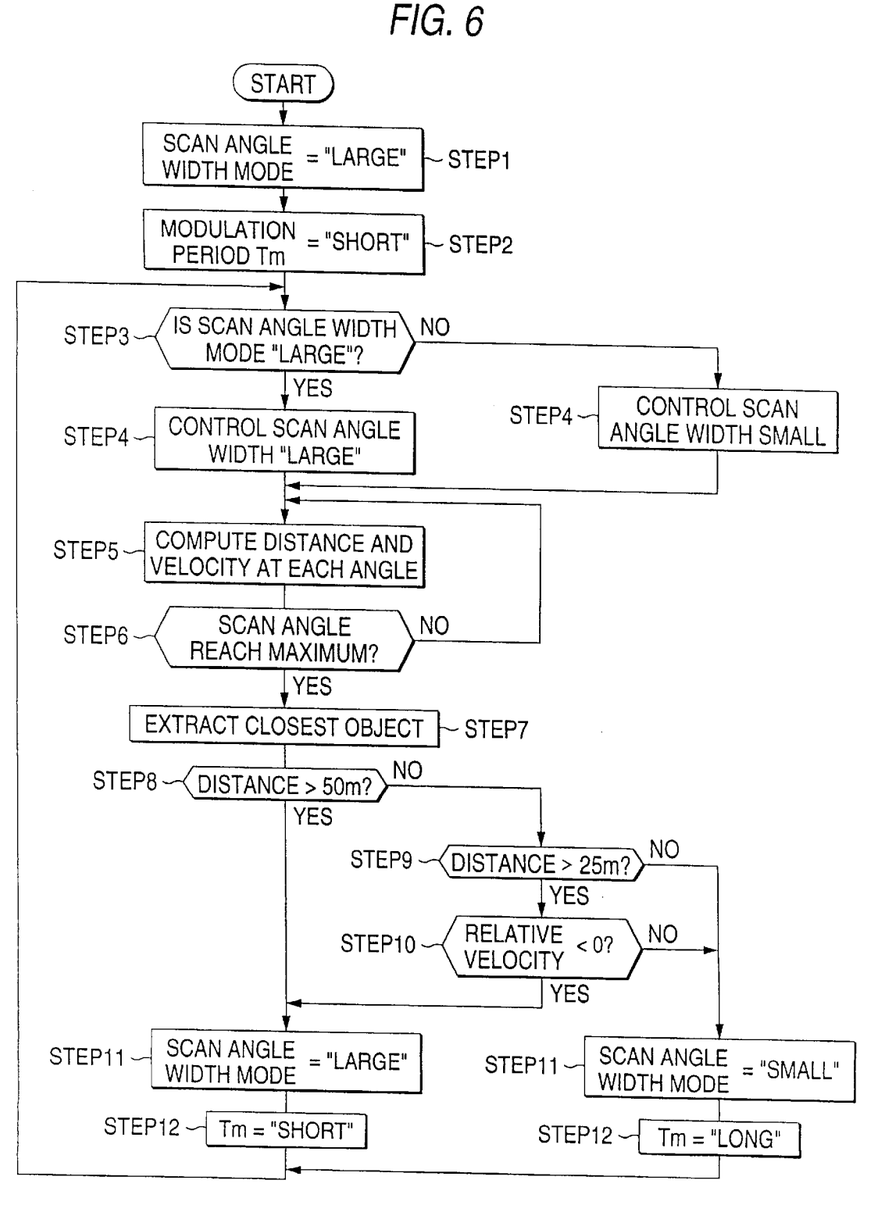
FIG. 6 is a flowchart illustrating control operation in accordance with the first embodiment.

Next, referring to the flowchart shown in FIG. 6, a description will be given of the control operation of the above-described vehicle-mounted radar apparatus. First, as initial values, "large" is inputted as the scan angle width mode (Step 1), and "short" is inputted as the modulation period Tm (Step 2). Then, in Step 3, a determination is made on the scan angle width mode, and if the scan angle width mode is "large," an instruction is given to the scanning mechanism 12 to make the scan angle width large (Step 4). On the other hand, if the scan angle width mode is "small" in Step 3, an instruction is given to the scanning mechanism 12 to make the scan angle width small (Step 4). Next, the relative distance and the relative velocity at each angle are computed until the scan angle with respect to each scan angle width mode becomes a maximum value (Steps 5 and 6).

If the scan angle becomes a maximum value, an object whose relative distance in each angle is the smallest is selected (Step 7). If the relative distance with that nearest object is greater than 50 m (Step 8), "large" is inputted as the scan angle width mode (Step 11), and the modulation period Tm is made short (Step 12). On the other hand, if the relative distance with that nearest object is equal to or smaller than 50 m in Step 8, and if the relative distance is greater than 25 m (Step 9) and the relative velocity is negative and the object is in a direction of moving away from the subject vehicle (Step 10), "large" is inputted as the scan angle width mode (Step 11), and the modulation period Tm is made short (Step 12). In contrast, if the relative distance with the nearest object is equal to or smaller than 25 m in Step 9 and the relative velocity is positive and the object is in a direction of approaching the subject vehicle (Step 10), "small" is inputted as the scan angle width mode (Step 11), and the modulation period Tm is made long (Step 12). After the scan angle width mode and the modulation period Tm are set in the above-described manner, the operation returns to Step 3.

In the first embodiment, in a case where the nearest object is in a far distance, and in a case where even if the nearest object is in a medium distance, the relative velocity is negative and the preceding vehicle is in a direction of moving away from the subject vehicle, the scan angle width is widened and the modulation period Tm is made short for early detection of a cutting-in vehicle and a plurality of dangerous objects and to shorten the data output period. On the other hand, in a case where the nearest object is in a near distance, and in a case where even if the nearest object is in a medium distance, the relative velocity is positive and the preceding vehicle is in a direction of approaching the subject vehicle, the scan angle width is narrowed and the modulation period Tm is made long so as not to shorten the data output period while improving the resolution of the relative velocity. In addition, in a case where the preceding vehicle is in the near distance, even if the scan angle width is widened, the same object is frequently detected in most directions. In such a case, no particular problem occurs even if the scan angle width is made narrow.

Although in the above-described first embodiment the scan angle width is changed in steps into two values of "large" and "small," the scan angle width may be changed continuously in correspondence with a distance value. Further, although in this first embodiment the modulation period Tm is changed to improve the resolution of the relative velocity, the frequency sweep bandwidth B may be changed to improve the resolution of the relative velocity, or both may be changed. In addition, although the scanning mechanism is mechanically driven, scanning may be effected in steps by such as a phased-array radar or the like.

As described above, according to the vehicle-mounted radar apparatus in accordance with the first embodiment, it is possible to improve the accuracy of the distance and the relative velocity by improving the distance resolution and the relative velocity resolution in correspondence with the traveling conditions without deteriorating the data output period, and it is possible to shorten the time duration for extracting the preceding vehicle from a plurality of target objects by shortening the period of detecting a target object in a wide range.

Second Embodiment

Figure 7:
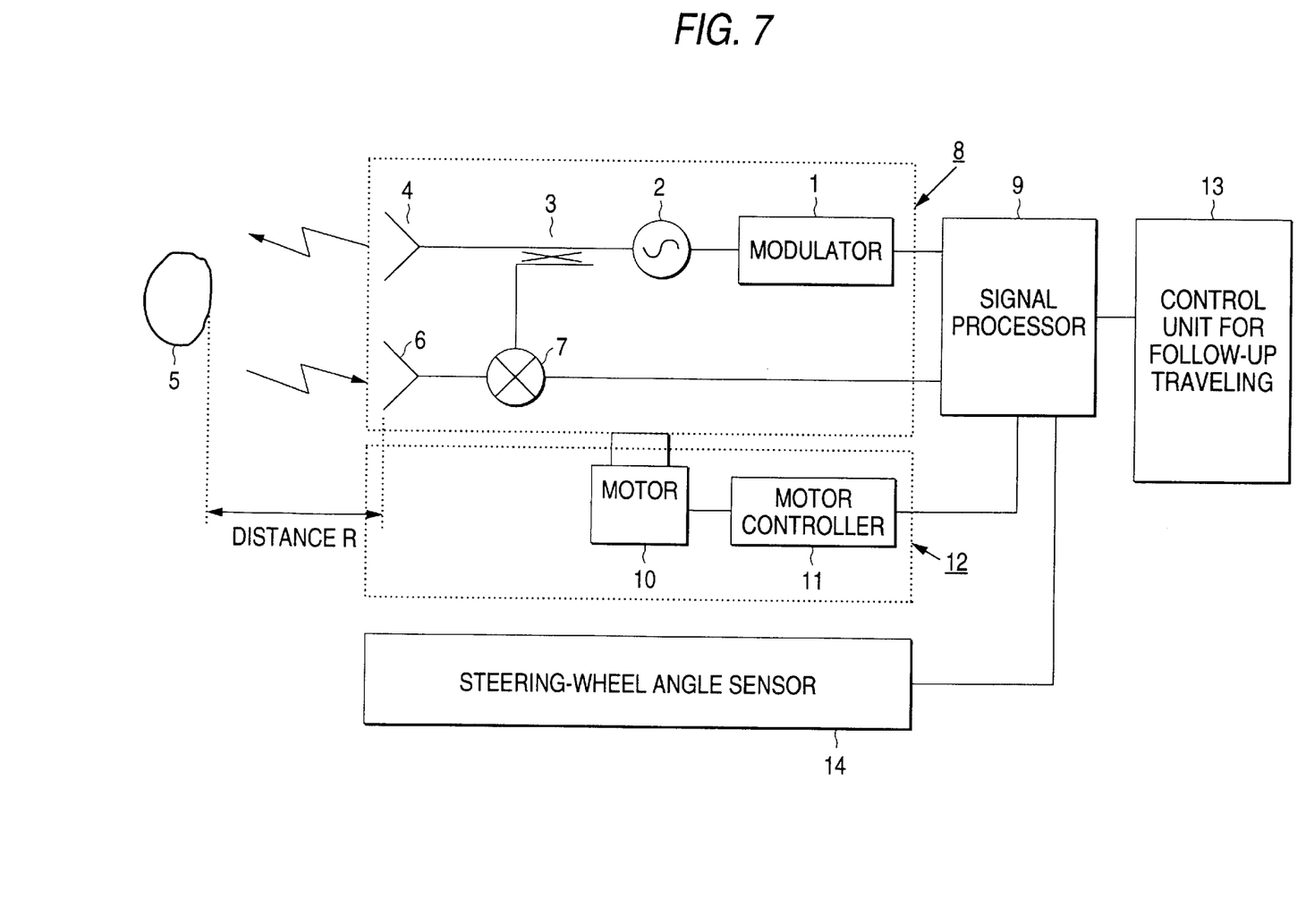
FIG. 7 is a block diagram illustrating the configuration of a vehicle-mounted radar apparatus in accordance with a second embodiment of the present invention.

FIG. 7 is a block diagram illustrating the configuration of the vehicle-mounted radar apparatus in accordance with a second embodiment of the present invention. In the same way as in the first embodiment, this vehicle-mounted radar apparatus is comprised of the transmitting-receiving device 8 including the modulator 1, the voltage controlled oscillator 2, the direction coupler 3; the transmitting antenna 4, the receiving antenna 6, and the mixer 7; the scanning mechanism 12 including the motor 10 and the motor controller 11; the signal processor 9; and the control unit 13 for follow-up traveling. In addition, in this second embodiment, an output of a steering-wheel angle sensor 14 is inputted to the signal processor 9.

Next, a description will be given of the operation of the apparatus in accordance with the second embodiment. The modulator 1 outputs a voltage signal for linear FM modulation, as shown in FIG. 2. The voltage controlled oscillator 2 generates an electromagnetic wave subjected to FM modulation on the basis of that voltage signal for FM modulation, as shown in FIG. 3. The electromagnetic wave outputted from the voltage controlled oscillator 2 is divided into two portions by the power divider 3, and one portion is inputted to the mixer 7. The other portion is outputted from the transmitting antenna 4 into space. The electromagnetic wave outputted to space from the transmitting antenna 4 is radiated to the target object 5 which is located at the distance R, and its reflected electromagnetic wave is inputted to the receiving antenna 6 with the delay time Td which is dependent on the distance R with respect to the transmitted electromagnetic wave, as shown in FIG. 4. Further, in a case where the target object 5 has a relative velocity, the received electromagnetic wave is inputted to the receiving antenna 6 by undergoing a Doppler shift by Fd with respect to the transmitted electromagnetic wave. The electromagnetic wave received by the receiving antenna 6 is mixed with the transmitted electromagnetic wave from the power divider 3 by the mixer 7, and a beat signal corresponding to the time delay Td and the Doppler shift Fd is outputted, as shown in FIG. 5.

Then, on the basis of the beat signal generated by the transmitting-receiving device 8, the signal processor 9 computes the relative distance to the target object 5 and the relative velocity in accordance with the formulae (1) above.

Meanwhile, the steering-wheel angle sensor 14 outputs the steering wheel angle of the subject vehicle to the signal processor 9.

Figure 8A:
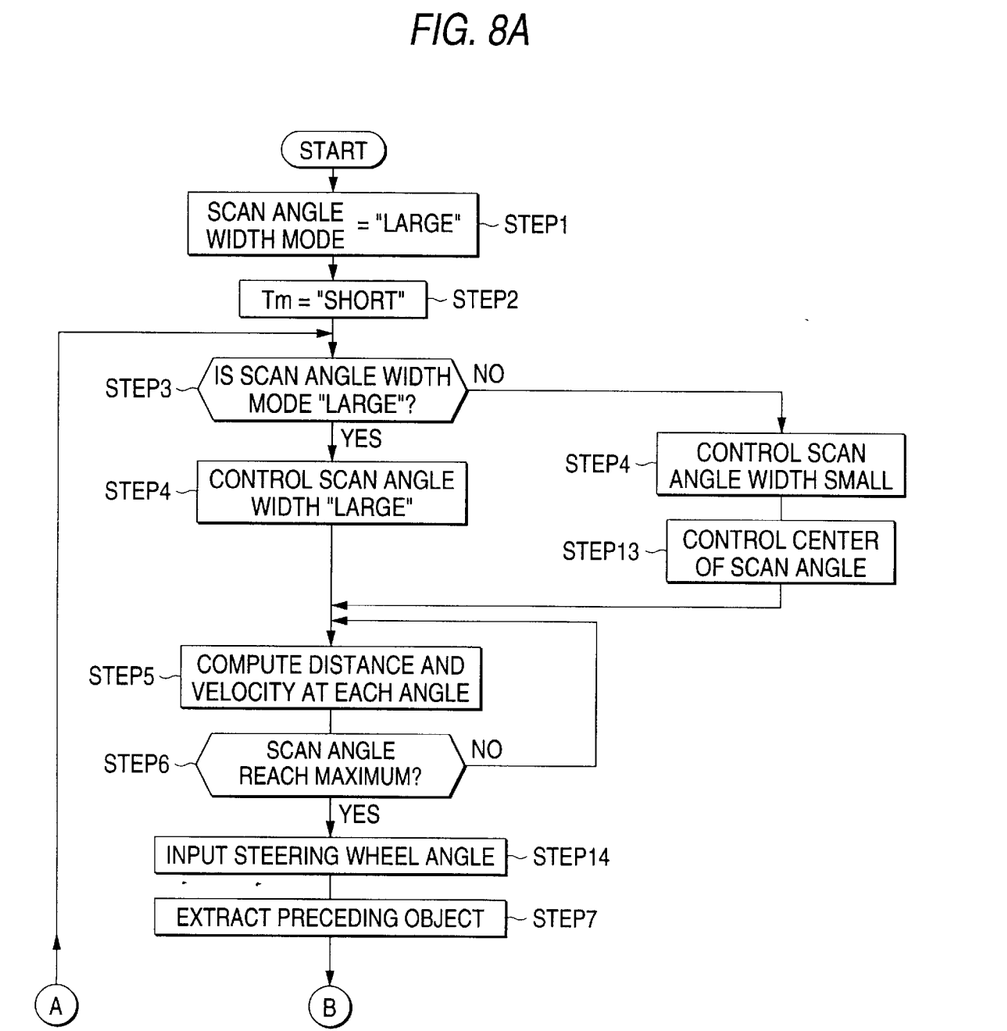
FIGS. 8A and 8B show a flowchart illustrating control operation in accordance with the second embodiment.
Figure 8B:
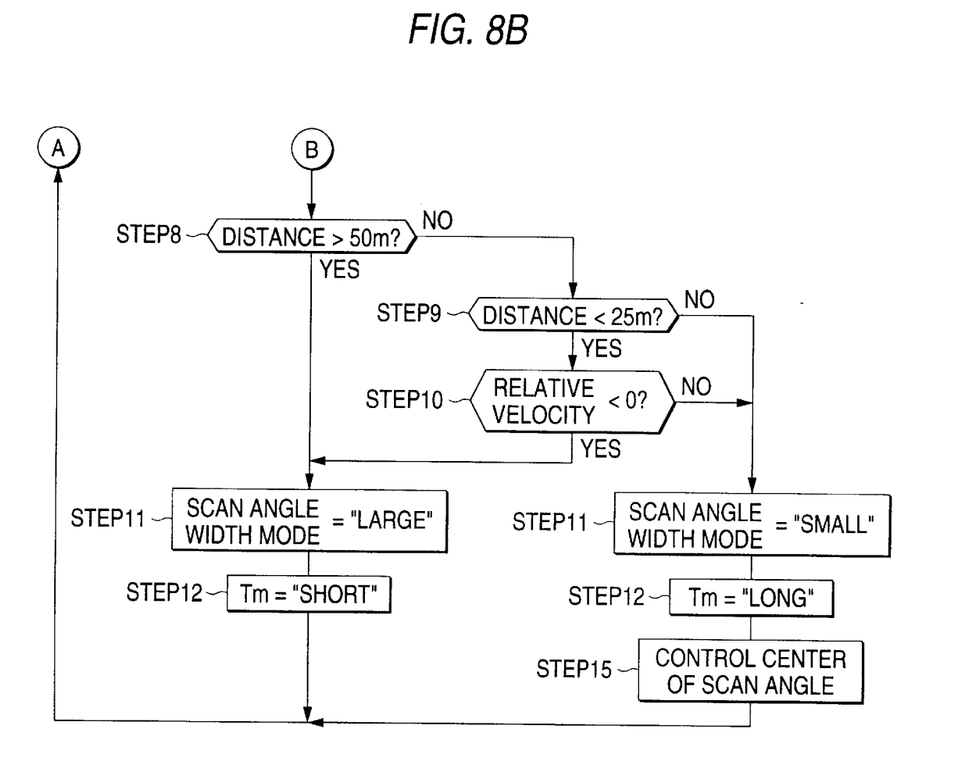

Next, referring to the flowcharts shown in FIGS. 8A and 8B, a description will be given of the control operation of the vehicle-mounted radar apparatus configured as described above. In FIGS. 8A and 8B, Steps 13 through 15 are added to the flowchart in accordance with the first embodiment.

First, in Step 1, "large" is inputted as an initial value of the scan angle width mode and, in Step 2, "short" is inputted as the modulation period Tm. Then, a determination is made on the scan angle width mode, and if that mode is "large," an instruction is given to the scanning mechanism 12 to make the scan angle width large (Steps 3 and 4). On the other hand, if the scan angle width mode is "small" in Step 3, an instruction is given to the scanning mechanism 12 to make the scan angle width small (Steps 3 and 4), and an instruction is given to the scanning mechanism 12 to effect scanning centering on the set scan angle (Step 13).

Next, the relative distance and the relative velocity at each angle are computed until the scan angle with respect to each scan angle width mode becomes a maximum value (Steps 5 and 6). If the scan angle becomes a maximum value, the steering wheel angle is inputted from the steering-wheel angle sensor (Step 14), and a preceding vehicle traveling on the same lane as the one where the subject vehicle is traveling is selected (Step 7). If the relative distance is greater than 50 m (Step 8), "large" is inputted as the scan angle width mode (Step 11), and the modulation period Tm is made short (Step 12). If the relative distance with the preceding vehicle is equal to or smaller than 50 m in Step 8, and if the relative distance is greater than 25 m (Step 9) and the relative velocity is negative and the preceding vehicle is in a direction of moving away from the subject vehicle (Step 10), "large" is inputted as the scan angle width mode (Step 11), and the modulation period Tm is made short (Step 12). If the relative distance with the preceding vehicle is equal to or smaller than 25 m in Step 9 and the relative velocity is positive and the preceding vehicle is in a direction of approaching the subject vehicle in Step 10, "small" is inputted as the scan angle width mode (Step 11), and the modulation period Tm is made long (Step 12). Further, the center of the scan angle is set (Step 15). After the scan angle width mode, the modulation period Tm, and the center of the scan angle are set, the operation returns to Step 3.

In the above-described second embodiment, in a case where the preceding vehicle is in a far distance, and in a case where even if the preceding vehicle is in a medium distance, the relative velocity is negative and the preceding vehicle is in a direction of moving away from the subject vehicle, the scan angle width is widened and the modulation period Tm is made short for early detection of a cutting-in vehicle and a plurality of dangerous preceding vehicles and to shorten the data output period. On the other hand, in a case where the preceding vehicle is in a near distance, and in a case where even if the preceding vehicle is in a medium distance, the relative velocity is positive and the preceding vehicle is in a direction of approaching the subject vehicle, the scan angle width is narrowed centering on the direction of the preceding vehicle and the modulation period Tm is made long so as not to shorten the data output period while improving the resolution of the relative velocity.

As described above, according to the vehicle-mounted radar apparatus in accordance with the second embodiment, it is possible to improve the accuracy of the distance and the relative velocity by improving the distance resolution and the relative velocity resolution in correspondence with the traveling conditions without deteriorating the data output period, and it is possible to shorten the time duration for extracting the preceding vehicle from a plurality of target objects by shortening the period of detecting a target object in a wide range. Further, on a curved road as well, it is possible to improve the accuracy of the distance and the relative velocity of the preceding vehicle without measuring distances and relative velocities of objects which are not the preceding vehicle. Furthermore, since the preceding vehicle is detected, it is possible to set thresholds for changing the scan angle width (in the second embodiment, set distances in Steps 8 and 9) to large values, so that even when a preceding vehicle in a far distance is detected, it is possible to improve the accuracy of the distance and the relative velocity.

Although in this second embodiment the scan angle width is changed in steps into two values of "large" and "small," the scan angle width may be changed continuously in correspondence with a distance value. Further, although in this second embodiment the modulation period Tm is changed to improve the resolution of the relative velocity, the frequency sweep bandwidth B may be changed to improve the resolution of the relative velocity, or both may be changed.

Furthermore, in the vehicle-mounted radar apparatus in accordance with the second embodiment, if a camera is used instead of the steering-wheel angle sensor, and the scan angle width is changed on the basis of the result of detection of a white line, it is possible to effect scanning centering on the direction of the preceding vehicle with high accuracy. In addition, the steering-wheel angle sensor and the camera may be used jointly.

As described above, in accordance with the present invention, it is possible to improve the accuracy of the distance and the relative velocity by improving the distance resolution and the relative velocity resolution in correspondence with the traveling conditions, and it is possible to shorten the time for extracting a preceding vehicle from among a plurality of target objects by shortening the period of detecting a target object in a wide range.

What is claimed is:

1. A vehicle-mounted radar apparatus comprising:

a transmitting-receiving device for transmitting an FM modulated electromagnetic wave to a target object and receiving a reflected electromagnetic wave from the target object;

a signal processor for computing a relative velocity of the target object and a relative distance to the target object in accordance with an output of said transmitting-receiving device; and a scanning mechanism for rotatively driving said transmitting-receiving device;

wherein a modulation period of the FM-modulated electromagnetic wave and a rotation angle range of said scanning mechanism are changed in accordance with the relative velocity of the target object and the relative distance to the target object.

2. A vehicle-mounted radar apparatus as claimed in claim 1, wherein said transmitting-receiving device comprises:

an FM modulator for generating an FM modulation signal;

a voltage controlled oscillator for generating an electromagnetic wave subjected to FM modulation by the FM modulation signal;

a power divider for dividing the FM-modulated electromagnetic wave into two portions;

a transmitting antenna for transmitting one divided portion of the FM-modulated electromagnetic wave;

a receiving antenna for receiving the electromagnetic wave reflected by a target object; and a mixer for mixing another divided portion of the FM-modulated electromagnetic wave and the electromagnetic wave from said receiving antenna and for outputting a beat signal; and said signal processor computes the relative velocity and the relative distance with respect to the target object which is a preceding vehicle on the basis of the beat signal, and wherein a modulation period of said FM modulator and a rotation angle range of said scanning mechanism are changed in accordance with the relative velocity and the relative distance with respect to the target object.

3. A vehicle-mounted radar apparatus as claimed in claim 1, wherein a preceding vehicle on a same lane as a lane where a subject vehicle is traveling is extracted as said target object.

4. A vehicle-mounted radar apparatus as claimed in claim 1, wherein said transmitting-receiving device comprises:

an FM modulator for generating an FM modulation signal;

a voltage controlled oscillator for generating an electromagnetic wave subjected to FM modulation by the FM modulation signal;

a power divider for dividing the FM-modulated electromagnetic wave into two portions;

a transmitting antenna for transmitting one divided portion of the FM-modulated electromagnetic wave;

a receiving antenna for receiving the electromagnetic wave reflected by a preceding vehicle; and a mixer for mixing another divided portion of the FM-modulated electromagnetic wave and the electromagnetic wave from said receiving antenna and for outputting a beat signal;

a signal processor for computing a relative velocity and a relative distance with respect to the preceding vehicle on the basis of the beat signal; and a scanning mechanism for rotatively driving said transmitting-receiving device;

wherein the preceding vehicle on a same lane as a lane where a subject vehicle is traveling is extracted, and a modulation period of the FM modulator and a rotation angle range of said scanning mechanism are changed in accordance with the relative velocity and the relative distance with respect to the preceding vehicle.

5. A vehicle-mounted radar apparatus as claimed in claim 3, wherein a steering sensor is used as a means for extracting the preceding vehicle on the same lane as the lane where the subject vehicle is traveling.

6. A vehicle-mounted radar apparatus as claimed in claim 4, wherein a steering sensor is used as a means for extracting the preceding vehicle on the same lane as the lane where the subject vehicle is traveling.

7. A vehicle-mounted radar apparatus as claimed in claim 3, wherein a camera is used as a means for extracting the preceding vehicle on the same lane as the lane where the subject vehicle is traveling.

8. A vehicle-mounted radar apparatus as claimed in claim 4, wherein a camera is used as a means for extracting the preceding vehicle on the same lane as the lane where the subject vehicle is traveling.

* * * * *